J. J. MEYER.
VALVE.
APPLICATION FILED JAN. 30, 1912.
1,052,939.
Patented Feb. 11, 1913.
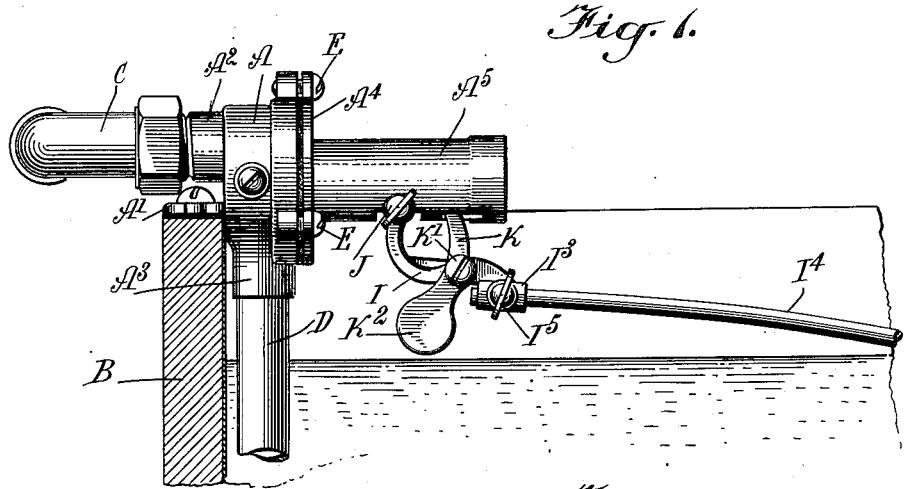
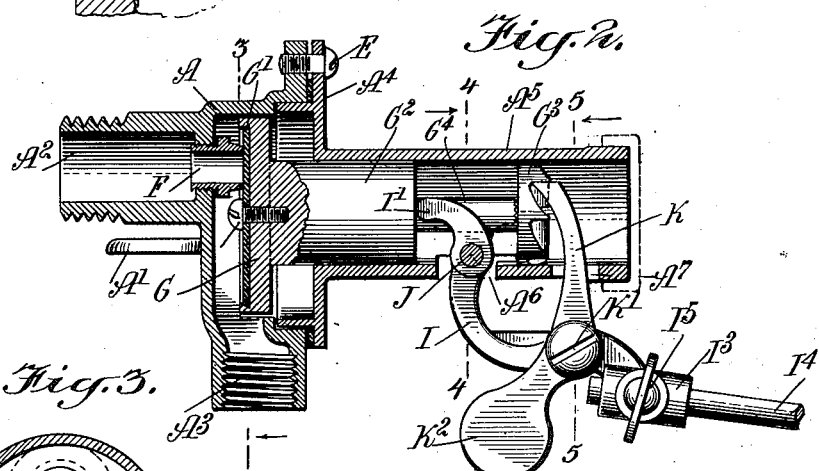
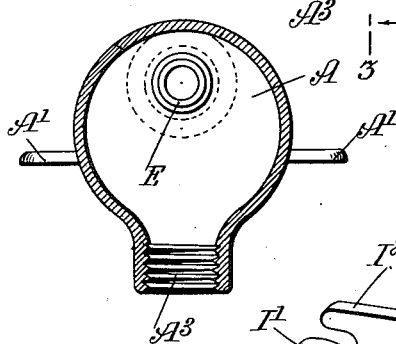
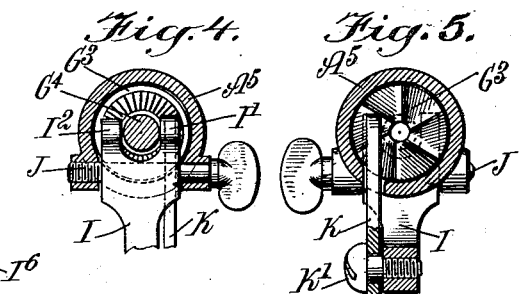
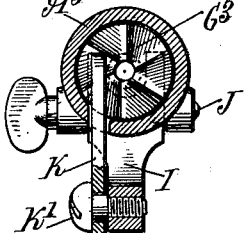
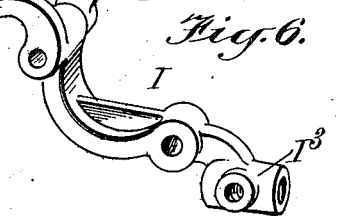
WITNESSES
INVENTOR
John J. Meyer
BY
ATTORNEYS

UNITED STATES PATENT OFFICE.

JOHN J. MEYER, OF YONKERS, NEW YORK.

VALVE.

1,052,939.

Specification of Letters Patent. Patented Feb. 11, 1913.

Application filed January 30, 1912. Serial No. 674,235.

*To all whom it may concern:*

Be it known that I, JOHN J. MEYER, a citizen of the United States, and a resident of Yonkers, in the county of Westchester and State of New York, have invented a new and Improved Valve, of which the following is a full, clear, and exact description.

The invention relates to valves such as shown and described in the Letters Patent of the United States, No. 998,543, granted to me on July 18, 1911.

The object of the present invention is to provide a new and improved valve for use in flushing tanks and similar devices, and arranged to insure a powerful closing of the valve with a view to prevent leakage, to present a different surface of the valve disk to its seat at each operation, to insure long life of the valve, and to prolong the period of repairing or rewashering the valve.

For the purpose mentioned use is made of a valve body provided with a valve seat and with a tubular bearing, a valve disk adapted to engage the said valve seat and having a stem mounted to slide and to turn in the said bearing, a float lever extending into the said bearing and engaging the said stem, a pivot pin for the float lever to swing on, the said pivot pin being held on the tubular bearing and its axis extending transversely within the surface of the bearing, and a pawl and ratchet mechanism, of which the pawl is carried by the said lever and the ratchet wheel by the said valve stem to rotate the valve disk.

A practical embodiment of the invention is represented in the accompanying drawings forming a part of this specification, in which similar characters of reference indicate corresponding parts in all the views.

Figure 1 is a side elevation of the valve arranged as a float-controlled supply valve and applied to the top of a flushing tank, the latter being shown in section; Fig. 2 is an enlarged sectional side elevation of the valve; Fig. 3 is a cross section of the same on the line 3—3 of Fig. 2; Fig. 4 is a similar view of the same on the line 4—4 of Fig. 2; Fig. 5 is a like view of the same on the line 5—5 of Fig. 2; and Fig. 6 is a perspective view of the float lever.

The valve body A is preferably of cylindrical shape, that is, provided with exterior lugs or flanges A' for attaching the valve body to the flushing tank B or other device, and the said valve body A is provided with an inlet $A^2$ connected by a pipe C with a source of water supply, and the valve body A is also provided with an outlet $A^3$ engaged by a pipe D extending into the tank B to supply the latter with water. The valve body A is closed at its open face by a head $A^4$ fastened in place by a fastening device E, and from the head $A^4$ extends a tubular bearing $A^5$, as plainly shown in the drawings.

Within the valve body A and connected with the inlet $A^2$ is arranged a valve seat F adapted to be engaged by the washer or the facing G' of a valve disk G provided with a stem $G^2$ mounted to slide and to turn in the tubular bearing $A^5$. The washer or facing G' is preferably provided with a beveled edge engaging a corresponding seat on the face of the valve disk G, and the middle of the washer G' is fastened in place by a screw H screwing into the disk G. By reference to Fig. 2 it will be noticed that the valve seat F is eccentric relative to the valve disk G, and when the device is in use and the valve disk is turned then the face of the valve disk presents a new surface to the seat F.

In order to impart a sliding and turning motion to the valve disk G, the following arrangement is made: A ratchet wheel $G^3$ is secured to the reduced portion $G^4$ of the valve stem $G^2$, and the face of the valve stem $G^2$ at the reduced portion $G^4$ is engaged by the head of a float-controlled lever I mounted to swing on a pivot pin J extending transversely and carried by the bearing $A^5$. On the lever I is fulcrumed a pawl K adapted to engage the ratchet wheel $G^3$ so that when the lever I swings upward then the head of the lever moves the valve disk G inward and at the same time a turning motion is given to the valve disk by the pawl K engaging the ratchet wheel $G^3$. When the lever I swings downward then the weight of the float and the pressure of the water passing through the seat F and pressing against the face of the disk G causes the latter to move outward into open position with a view to allow the water to flow from the inlet $A^2$ to the outlet $A^3$ and by way of the pipe D into the tank B. The head of the lever I is preferably in the form of a fork having forked members I', $I^2$, straddling the reduced portion $G^4$ of the stem $G^2$, and the forward ends of the said forked members $I'$, $I^2$ engage the face of the stem $G^2$ at the reduced portion $G^4$. The lever I is further provided with a socket $I^3$ engaged by the rod $I^4$ carrying the float, and the said rod is fastened in position in the socket $I^3$ by a set screw $I^5$. The member $I^2$ of the head of the lever I is provided with an extension $I^6$ adapted to engage the back of the ratchet wheel $G^3$ with a view to positively move the valve disk G outward and at the same time impart a slight turning motion to the ratchet wheel $G^3$ and consequently the valve disk G to insure an accurate engagement of the pawl K with the next following tooth of the ratchet wheel $G^3$ at each downward swinging movement of the lever I. It will also be noticed that by this extra turn given to the ratchet wheel the float need not sink so far down in the tank for the pawl to engage the next tooth of the ratchet wheel and hence a shallower tank can be used. The terminal of the extension $I^6$ is preferably roughened or serrated and the back of the ratchet wheel $G^3$ is similarly roughened or notched (see Fig. 4) to insure a proper contact of the extension $I^6$ with the back of the ratchet wheel $G^3$ to slightly turn the same. Thus the action of the head of the lever I on the ratchet wheel $G^3$ is such as to insure at all times proper engagement of the pawl K with the ratchet wheel $G^3$. The pawl K is mounted to swing on a stud screw $K'$ screwed on the lever I, and the pawl K is also provided with a weight $K^2$ for holding the pawl K in engagement with the ratchet wheel $G^3$.

By reference to the drawings it will be noticed that the pivot pin J for the float lever I is carried by the bearing $A^5$ and its axis is within the bottom of the said bearing $A^5$, that is, the axis of the pivot pin J is located as close as possible to the axis of the valve disk G so that the float lever exerts a powerful pressure on the stem $G^2$ of the valve disk G, to move the latter into closed position with a view to powerfully press the washer $G'$ in contact with the valve seat F to close the latter without the slightest danger of leakage. It will also be noticed that the float lever I extends through a slot $A^6$ in the bottom of the bearing $A^5$, and the pawl K similarly extends through a slot $A^7$ in the said bearing so that the actuating mechanism is very compactly arranged.

It is understood that by locating the pivot pin J directly in the wall of the bearing $A^5$ it is protected against injury by careless workmen and at the same time the fulcrum of the lever I is located as high up as possible relative to the axis of the valve disk G to insure the exertion of a powerful closing pressure on the valve disk.

Having thus described my invention, I claim as new and desire to secure by Letters Patent:

1. A valve, comprising a valve body having a tubular bearing, an inlet and an outlet, a valve seat intermediate the said inlet and outlet, a valve disk for engagement with the said seat and having a valve stem mounted to turn and to slide in the said tubular bearing, the stem having a reduced portion, a ratchet wheel on the said reduced portion, and a float lever carrying a pawl engaging the said ratchet wheel, the said float lever having a head engaging the valve stem at the reduced portion, and approximately at points located in a horizontal plane passing through the axis of the stem, the points of contact being approximately equal distances from the axis of the stem, the fulcrum of the said float lever being directly on the said bearing and its axis extending transversely within the bore of the bearing.

2. A valve, comprising a valve body having an inlet and an outlet, a valve seat intermediate the said inlet and outlet, a valve disk for engagement with the said seat and having a valve stem mounted to turn and to slide in the said valve body, the stem having a reduced portion, a ratchet wheel on the said reduced portion, and a float lever carrying a pawl engaging the said ratchet wheel, the said float lever having a forked head extending into the bearing and straddling the reduced stem portion, the members of the forked head engaging the face of the stem at the reduced portion and the points of contact being approximately at equal distances from the axis of the valve stem, one of the said members having a rearward extension engaging the back of the ratchet wheel.

In testimony whereof I have signed my name to this specification in the presence of two subscribing witnesses.

JOHN J. MEYER.

Witnesses:
THEO. G. HOSTER,
PHILIP D. ROLLHAUS.